United States Patent [19]

Espelage et al.

[11] 4,227,138
[45] Oct. 7, 1980

[54] REVERSIBLE VARIABLE FREQUENCY OSCILLATOR FOR SMOOTH REVERSING OF AC MOTOR DRIVES

[75] Inventors: Paul M. Espelage, Ballston Lake, N.Y.; Loren H. Walker, Salem, Va.

[73] Assignee: General Electric Company, Schenectady, N.Y.

[21] Appl. No.: 895,136

[22] Filed: Apr. 10, 1978

[51] Int. Cl.³ .............................................. H02P 7/42
[52] U.S. Cl. ................................... 318/802; 318/801; 318/807; 318/808; 318/810; 318/811
[58] Field of Search ............... 318/721, 722, 723, 729, 318/799, 800, 801, 807, 808, 809, 810, 811, 802

[56] References Cited

U.S. PATENT DOCUMENTS

| | | | |
|---|---|---|---|
| 3,748,556 | 7/1973 | Gillett | 318/729 |
| 3,829,754 | 8/1974 | Rettig | 318/227 |
| 3,919,609 | 11/1975 | Klautschek et al. | 318/227 |
| 3,962,614 | 6/1976 | Rettig | 318/801 |
| 4,088,934 | 5/1978 | D'Atre et al. | 318/808 |
| 4,134,055 | 1/1979 | Akamatsu | 318/756 |
| 4,137,489 | 1/1979 | Lipo | 318/722 |

OTHER PUBLICATIONS

Plunkett et al., "Synchronous Control of a Static AC Induction Motor Drive," *Conference Record of IEEE,* 10/77, pp. 609-615.

Lienau et al., "Power Converters for Feeding a Synchronous Traction Motors of Single Phase AC Vehicles," *Conference Record of IEEE,* 1977, pp. 295-304.

*Primary Examiner*—J. V. Truhe
*Assistant Examiner*—Eugene S. Indyk
*Attorney, Agent, or Firm*—Donald R. Campbell; James C. Davis; Marvin Snyder

[57] ABSTRACT

A variable speed ac motor drive such as a controlled current inverter drive with load angle control generates an inverter frequency command signal which at low speed has a large ripple component and a small dc component representing the desired frequency. A variable frequency oscillator is responsive only to the dc component and supplies timing pulses to a ring counter which generates thyristor gating signals in the forward and reverse phase sequence. Smooth reversing over a wide range of torque is realized, and multipulse operation is inherent at low speeds to modulate the inverter output and minimize cogging torque.

11 Claims, 6 Drawing Figures

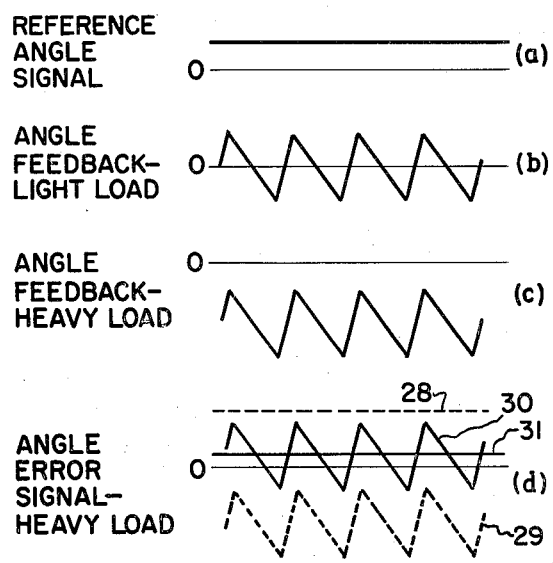
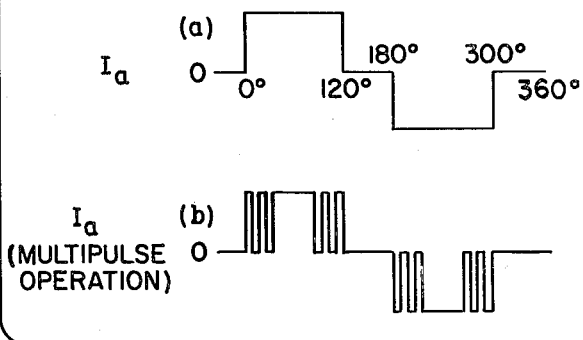
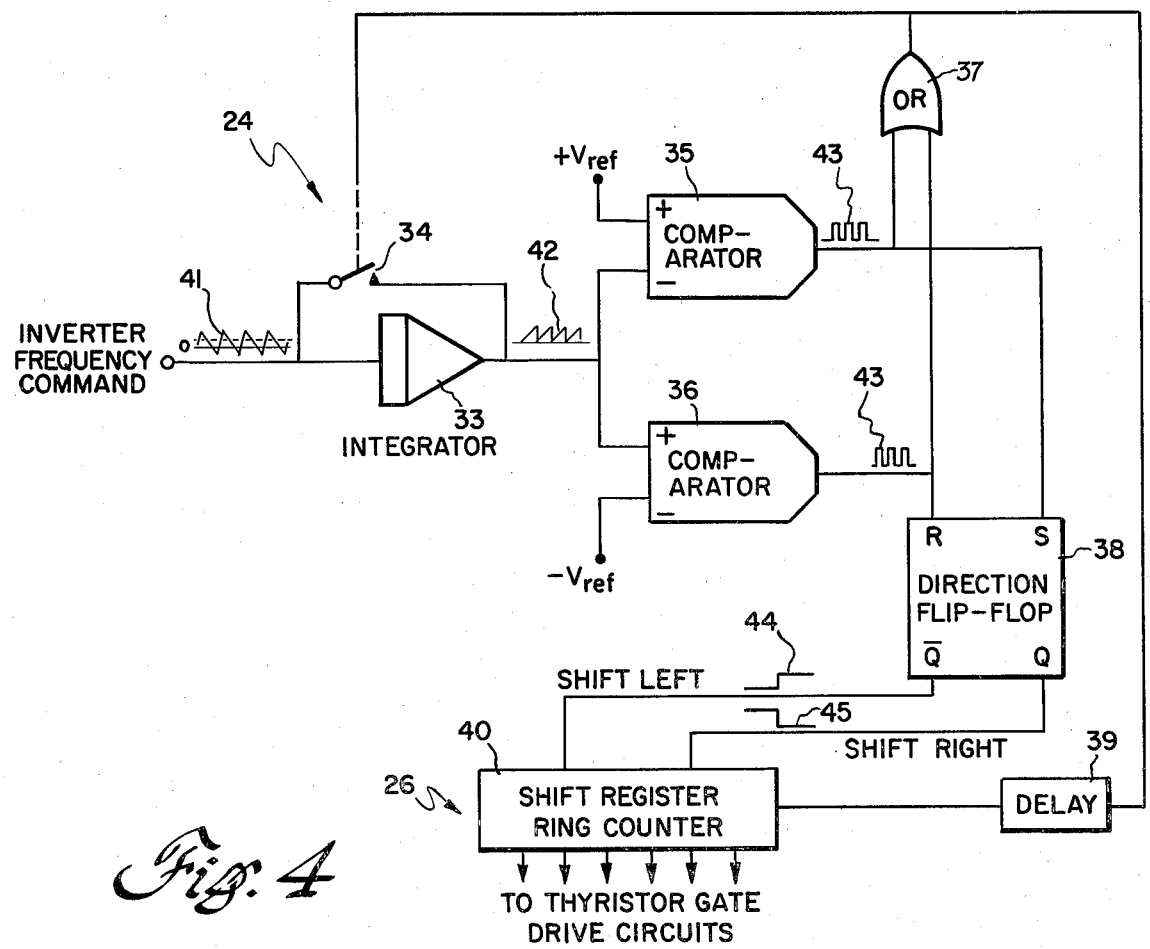

REVERSIBLE VARIABLE FREQUENCY OSCILLATOR FOR SMOOTH REVERSING OF AC MOTOR DRIVES

BACKGROUND OF THE INVENTION

This invention relates to variable speed ac motor drives implemented with controlled current or voltage-fed inverters, and more particularly to an inverter frequency control having a reversible variable frequency oscillator capable of inherent multipulse operation for smooth reversing of the motor drive.

Current inverter drives utilizing load angle control are one of the several different types of static adjustable frequency ac motor drives. In these systems at low speed operation the desired frequency is the small dc component of the inverter frequency command signal which also has a large amplitude sixth harmonic ripple. It is not feasible to filter this signal and maintain required system dynamic performance. Both the desired frequency and sense of motor rotation, forward or reverse, must be determined from the signal, and operation and reversing must be smooth over a wide torque range. Without special effort when using angle control, low speed operation and reversing can be very unstable in that the drive can fall into a mode of repeated reversals which yield totally unsatisfactory system performance and which can damage the mechanical load. Load angle control of a controlled current inverter drive and pulse width modulated voltage inverter drive is disclosed and claimed in allowed application Ser. No. 729,042, (now U.S. Pat. No. 4,088,934 issued May 9, 1978) filed on Oct. 4, 1976 by T. A. Lipo, A. B. Plunkett, and J. D. D'Atre and assigned to the assignee of this invention. For the transportation application being developed, the problem was solved by means of a diode clipper which limited the dynamic range of the angle error signal prior to inputting to a proportional plus integral controller. The present drive system developed for another application does not contain an integration of the angle error signal and it was determined that the simple diode clamp was not a solution.

The operation of controlled current and square wave voltage inverters in a pulse width modulated mode, with the timing of the pulses optimized mathematically to eliminate various harmonics, has been described in the prior art. The usual means of timing these pulses, however, is to generate a proper pattern at signal level using digital logic in a counting mode. Multipulse operation can reduce or eliminate detrimental cogging torque at low speeds, but previous attempts to combine multipulse operation with load angle regulation have not been successful.

SUMMARY OF THE INVENTION

A reversible variable speed ac motor drive constructed with either a controlled current inverter or square wave voltage inverter has an improved variable frequency oscillator in the inverter frequency control to attain smooth operation and reversing over a wide range of torque. The inverter frequency command signal fed to the oscillator has a substantial ripple component and a dc component whose magnitude and polarity are indicative of the speed and direction of motor rotation. The oscillator includes an integrator and is operative to generate timing pulses at a frequency dependent only on the level of the dc component in the input signal, and forward or reverse direction signals depending on its polarity. A ring counter or its equivalent generates gating pulses for the inverter main thyristors in the forward and reverse phase sequence.

The oscillator and inverter frequency control are particularly adaptable to current inverter drives utilizing load angle control, but has the same advantages for torque control. The chattering problem encountered with prior art techniques especially at high torque, low speed operation and high or low torque, low speed reversals is eliminated; under these conditions the frequency command signal is almost all ripple or has a large ripple component. Multipulse operation is furthermore inherent at low speeds, and the resulting inverter waveforms take on a pulse width modulated characteristic which reduces torque modulations and enhances operation of the inverter commuation circuits.

The preferred form of the reversible variable frequency oscillator comprises an integrator with a paralleled resetting switch in combination with positive and negative comparators and a logic gate which are operative to generate timing pulses used as clock pulses for a shift register ring counter. The timing pulses are fed to a direction flip-flop to generate shift left and shift right inputs corresponding to forward and reverse commands. An overcurrent signal causes the oscillator output to cease, and a minimum frequency limit mechanism can be included in the oscillator.

BRIEF DESCRIPTION OF THE DRAWINGS

FIGS. 3a–3d are waveforms of the reference angle signal and of the angle feedback signal under light and heavy load conditions, and of the angle error signal with a small dc component and large ac ripple under heavy load conditions;

FIG. 4 is a block diagram of the reversible variable frequency oscillator and shift register ring counter;

FIGS. 5a and 5b are single phase output current waveforms for normal and multipulse operation.

DESCRIPTION OF THE PREFERRED EMBODIMENTS

A reversible variable frequency oscillator has application in variable speed ac motor drives where extremely smooth operation and reversing over a wide range of torque is required. The oscillator and inverter frequency control circuit of which it is the primary component is particularly adaptable to current inverter drives utilizing load angle control, but is also applicable to other regulators or other inverter types. In these systems at low speed operation, the desired frequency is the small dc component in a large ac signal, and it is not feasible to filter this signal and maintain required system dynamic performance. The oscillator described herein uniquely solves several of the subtle problems as is necessary to provide a high performance drive system, and is inherently capable of multipulse mode of operation such that a more complex inverter waveform is produced as speed is reduced to eliminate or minimize pulsations at frequencies low enough to cause cogging or excite mechanical resonances in the motor and load.

Figure 1:
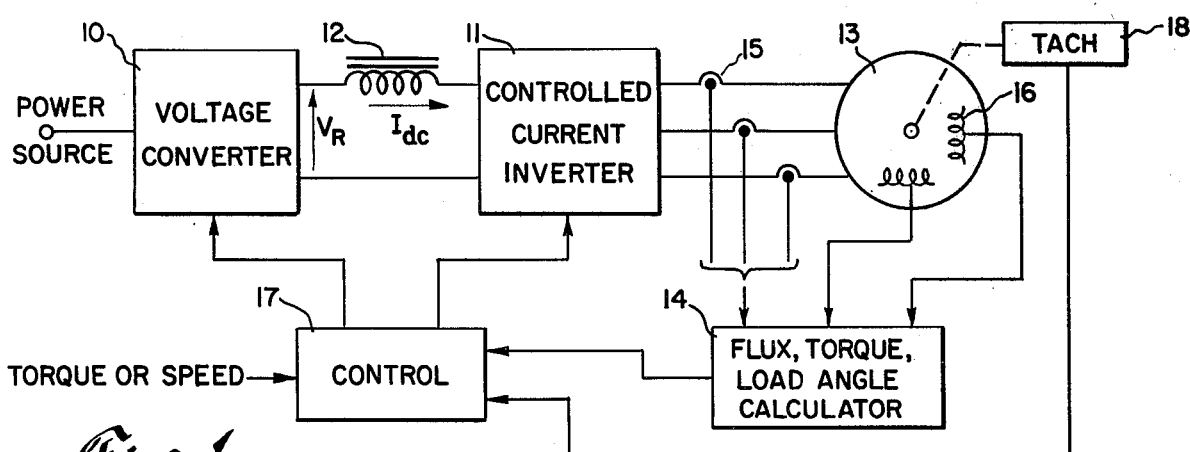
FIG. 1 is a simplified block diagram of a static ac motor drive with a controlled current inverter and angle control.

A controlled current ac motor drive is illustrated in simplified block diagram form in FIG. 1 with provision for load angle control or torque control. In this system ac or dc power is converted to variable amplitude dc power by means of a voltage converter 10 such as phase controlled ac/dc rectifier or a dc/dc chopper. The power is then converted to ac form by means of a controlled current inverter 11, and a dc reactor 12 is inserted in the dc link so as to smooth the ripple currents inherent in inverter or chopper operation. The polyphase nonsinusoidal inverter output current has a variable frequency with the dc link current magnitude, and is fed to an adjustable speed ac motor such as induction motor 13. Controlling the magnitude of the voltage $V_R$ applied to the dc link by voltage converter 10 adjusts the level of dc link current $I_{dc}$, and hence the stator current, while controlling the operating frequency of controlled current inverter 11 adjusts the stator excitation frequency. In order to realize practical operation of the motor and the entire converter, stabilizing feedback must often be used to maintain normal motor flux and current levels. Conventional control methods realize this stabilization by dynamic control of the motor current and amplitude. The load angle control scheme utilizes the inverter frequency as the necessary system stabilizing control and is achieved by regulating the phase angle between motor current and motor flux. This approach causes the inverter firing pulses to synchronize to the motor counter-emf and is the dual of the voltage fed induction motor wherein additional current is inherently provided to align the motor counter-emf to the inverter.

Additional information and a specific implementation of a static ac drive with load angle feedback control is given in allowed application, Ser. No. 729,042, (now U.S. Pat. No. 4,088,934) filed on Oct. 4, 1976 by J. D. D'Atre, A. B. Plunkett and T. A. Lipo, entitled "Means for Stabilizing AC Electric Motor Drive System" and assigned to the same assignee as this invention, the disclosure of which is incorporated herein by reference. Such drive systems have an instantaneous flux, instantaneous torque, and instantaneous load angle calculator 14 which receives information from motor current sensors 15 and air gap flux coils 16 and supply feedback signals to control 17, and may or may not have a tachometer 18 generating a rotor speed feedback signal. The air gap flux $\psi$ in units of volts and the instantaneous electromagnetic torque $T_e$, defined as the product of the q-axis stator current and d-axis air gap flux minus the product of the d-axis stator current and q-axis air gap flux, can be derived by the circuitry given in the foregoing allowed application. To implement calculation of the instantaneous load angle or torque angle, it is preferred not to calculate the actual phase angle $\theta$ between motor current and motor flux, but to generate instead the approximate feedback signal $(\sin \theta)_{eq}$ because this quantity increases monotonically over the entire operating region and therefore is a more suitable variable for angle regulation schemes. The equivalent quantity is given by the equation $$(\sin \theta)_{eq} = \frac{T_e}{I_{dc}(|\psi| - kI_{dc})}, \quad (1)$$

where $I_{dc}$ denotes the dc link current and k is a constant. Other circuitry for generating the sensed value of load angle is given in the foregoing allowed patent application and in the article by the same inventors entitled "Synchronous Control of a Static AC Inductor Motor Drive", Conference Record of the IEEE Industry Applications Society Annual Meeting, October 2-6, 1977, pages 609-615.

Figure 2:
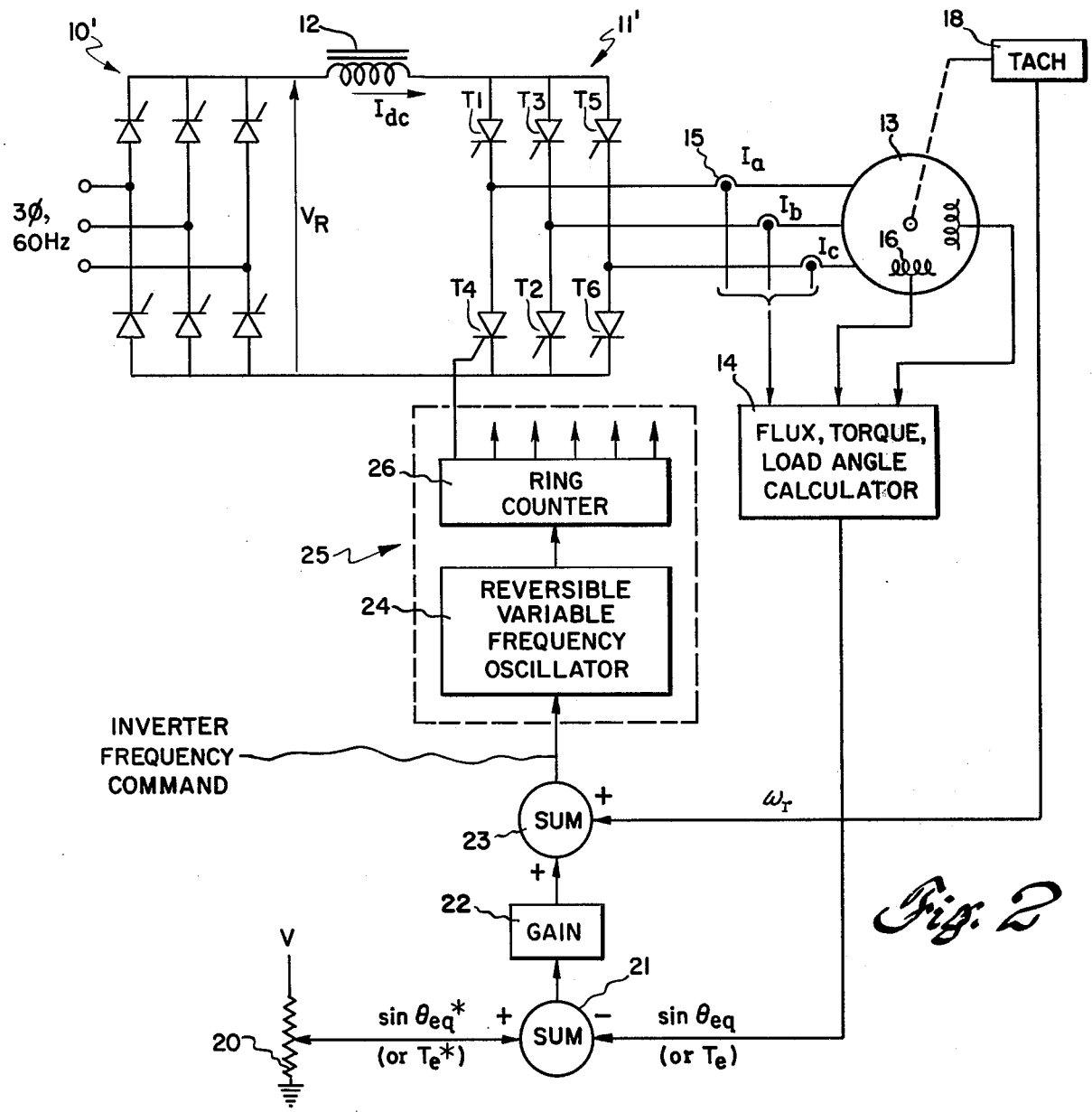
FIG. 2 is a schematic diagram partially in block diagram form of the controlled current inverter ac motor drive with the load angle regulation loop illustrated in detail and other system details omitted.

Referring to FIG. 2, the load angle regulation loop of a controlled current inverter induction motor drive is illustrated in detail and other portions of the controller are omitted for clarity. The front end voltage converter is a phase controlled rectifier 10' energized by a three-phase, 60 Hz voltage source, and controlled current inverter 11' is a polyphase thyristor bridge inverter such as the improved autosequential commutated inverter disclosed in U.S. Pat. No. 3,980,941 to R. F. Griebel, which is assigned to the same assignee as this invention. Controlled current inverters are also known as current source inverters or current-fed inverters, and other types are known in the art and can be used in the practice of this invention including the third harmonic auxiliary commutated inverter with one commutating capacitor and the auxiliary impulse commutated inverter with three commutating capacitors. Angle feedback signal $\sin \theta_{eq}$ and a command or reference value designated $\sin \theta_{eq}^*$, shown schematically as a manually set voltage level at the wiper of potentiometer 20, are presented to a summer 21 which generates the angle error signal. After being passed through a gain network 22, the angle error signal with a substantial ripple component and a positive or negative dc rotor speed feedback signal $\omega_r$ are presented to a summer 23 which produces at its output the inverter frequency command signal. The function of reversible variable frequency oscillator 24 in improved inverter frequency control circuit 25 is to convert the dc component of the input command signal, which is either positive or negative depending upon the direction of motor rotation, into timing pulses with a frequency equal to six times the desired motor frequency and into forward or reverse direction signals. The timing pulses and direction signals are fed to a ring counter 26 for the generation of thyristor gaining pulses in either the forward or reverse phase sequence, and gate drivers ordinarily included in the control circuit are not shown. Inverter main thyristors T1–T6 are numbered in the order of their firing for the forward phase sequence and commutation details are omitted. Before proceeding, it is pointed out that a torque feedback control which operates to adjust the inverter frequency to minimize the error between a reference value of torque $T_e^*$ and a torque feedback signal $T_e$ is also possible utilizing the same control circuitry inasmuch as the feedback signals for instantaneous torque and instantaneous load angle are similar in shape.

The angle reference, angle feedback, and angle error signals (these are the inputs and output of summer 21) under various load conditions are diagrammed in FIGS. 3a–3b to understand the problem existing particularly at high torque, low speed operation and at high or low torque, low speed reversals. The reference angle signal (FIG. 3a) is a variable level dc signal. The angle feedback signal typically is composed of a dc component and a large amplitude sixth harmonic ripple; at light load (FIG. 3b) the angle feedback is substantially all ripple and at heavy load (FIG. 3c) there is a large dc component and the signal is approximately 50 percent ripple. At the summer inputs the angle feedback signal is negative whereas the reference is positive in polarity. The angle error at heavy load (FIG. 3d), generated by summing dc reference 28 and angle feedback 29, is indicated in heavy lines at 30 and has a very small dc component 31. At low motor speeds the tachometer feedback signal $\omega_r$ is also a relatively small dc signal so that the inverter frequency command signal, which is the sum of the angle error and tachometer feedback signals, has a large amplitude ripple component and a small dc component from which the desired motor frequency and desired sense of motor rotation must be determined. The fundamental motor frequency is the electrical equivalent of the mechanical speed (rpm) at which the shaft is rotating. During low speed reversals at either high or low torque, the tachometer feedback signal is small and passes through zero with the result that the inverter frequency command has a large ripple component and a small dc component. The large ripple component is not detrimental to operation of reversible variable frequency oscillator 24 and in fact is utilized to advantage for multipulse operation when reversing the motor at low speeds.

A number of requirements in addition to those already mentioned are placed on the variable frequency oscillator in a controlled current inverter ac motor drive with load angle feedback control. Angle control is required for stability at high and low speed at no load. The variable frequency oscillator is not to degrade the dynamic performance of the overall system, and desirably includes a mechanism for minimum frequency limit and provision for the oscillator output to cease on overcurrent detection. The variable frequency oscillator must eliminate the chattering problem previously encountered with other implementations especially at high torque, low speed operation and high or low torque, low speed reversals. A simple economical solution is required. If a gain change is introduced into the oscillator at any region of operation, a corresponding change would have to be made in other portions of the regulator in that the programmed flux-torque profile of the motor be maintained to minimize torque ripple.

FIG. 4 is a block diagram of the preferred form of reversible variable frequency oscillator 24 and ring counter 26. The main oscillator components are an integrator 33 in parallel with which is a resetting switch 34, positive and negative comparators 35 and 36 at the integrator output in parallel with one another, a logic gate 37 located between both comparators and resetting switch 34, a direction flip-flop 38 having set and reset inputs connected to the comparators, and a delay element 39 placed between logic gate 37 and the clock pulse input of ring counter 26. The latter component is a conventional shift register with six stages connected as a reversible ring counter. Integrator 33 can be an integrated circuit operational amplifier with a feedback capacitor between the output terminal and summing junction, and resetting switch 34 is a solid state switch shunting the integrating capacitor.

Inverter frequency command signal 41 is the input to integrator 33 and, assuming that switch 34 is open, a ramp output 42 is generated which rises at a rate dependent only upon the dc component of the input signal. Depending on the polarity of this dc component, the input is integrated up to a positive reference value $+V_{ref}$ or negative reference value $-V_{ref}$ established for comparators 35 and 36, respectively. For the case of integrating up to the positive reference, the output of comparator 35 changes from low to high and the signal is gated by OR logic circuit 37 to resetting switch 34, closing the switch and resetting the feedback capacitor. The integrator output now drops with the result that comparator 35 changes state from high back to low output because the positive reference value is no longer exceeded, thereby generating a timing pulse 43. A train of such timing pulses is produced either at the output of comparator 35 or comparator 36 at a frequency dependent upon the amplitude of the dc component of the command signal, and all timing pulses are gated by OR circuit 37 and pass through delay element 39 to be fed to the clock input of shift register 40.

The timing pulses from positive comparator 35 are fed to the set input of direction flip-flop 38 and those from negative comparator 36 are fed to the reset input. The Q output and $\overline{Q}$ complementary output of the flip-flop are forward and reverse direction signals 44 and 45, or vice versa, one of which is up and the other down and these direction signals are fed to the shift left and shift right inputs of shift register ring counter 40. If the comparator changing state is the same one as previously, the flip-flop state remains the same. If the alternate comparator changes state, the flip-flop state changes, thereby reversing the rotation of the ring counter and thus also the motor phase sequence. The function of delay element 39 is to delay the timing pulses by a small amount so that the shift left and shift right commands are received by the shift register before the clock pulses arrive.

Inverter frequency control 25 and reversible variable frequency oscillator 24 when operated in the closed feedback loop system of FIG. 2 is inherently capable of a multipulse mode of operation which adds substantially to its utility in a motor drive system. The resulting inverter waveforms take on a pulse width modulated characteristic which reduces torque modulation and enhances operation of the inverter commutation circuits. In a controlled current inverter or square wave voltage inverter used as a motor drive system, torque pulsations are produced at six times the fundamental frequency. When the operating speed is low, the frequency of the torque pulsations may be low enough to cause cogging or excite mechanical resonances in the motor and load. The multipulse mode of operation reduces the amplitude and raises the minimum frequency of the pulsations without changes to the inverter power circuit. If the inverter is of the voltage source type, the low order of voltage harmonics may cause high harmonic currents and the multipulse mode of operation reduces the amplitude and increases the minimum frequency of these current harmonics. Another problem that may occur in any thyristor inverter operated at very low frequency is that the commutating capacitor may discharge during the long duration between commutations. It may not have sufficient charge remaining to execute the next commutation; multipulse operation allows the inverter to operate at an arbitrarily low fundamental frequency while maintaining a maximum time between commutations which is much less than one-third of the period of the fundamental frequency. This invention realizes the multipulse mode of operation with no special hardware at signal or power level. When the frequency of operation is quite low, tachometer feedback signal $\omega_r$ (FIG. 2) is a dc level which is smaller or much smaller than the angle reference or calculated load angle feedback. Under these conditions, the angle error signal presented to summer 23 is the difference between a constant reference and a sensed instantaneous sine angle. Neglecting the small tachometer input, integrator 33 integrates this error and causes ring counter 26 to shift left or shift right when the integrator error reaches the level set by the comparator references. Each shifting left or right of shift register 40 corresponds to a firing of thyristors in the inverter in a phase rotation sense corresponding to the sense of shift register direction. Alternate shifts, left and right, will cause the motor current to execute the multipulsing characteristic needed to duplicate the desired waveforms. The normal single phase inverter output current waveform in FIG. 5a has opposite polarity current pulses of 120 degrees duration. The multipulse mode of operation shown in FIG. 5b places notches in the current waveform or generates multiple pulses during the 120 degree interval and the notches are in a near optimum location to minimize torque error. The timing pulses are generated at a rate exceeding the usual six times commanded fundamental excitation frequency.

In operation, the action of variable frequency oscillator 24 is to shift forward or backward as called for by the integrated error between command and instantaneous load angle. Thus, the oscillator will act as a "bang-bang" regulator to minimize the integrated error between reference angle and commanded angle, and the effect of the pulsing operation is to hold the desired angle as close to the reference as possible in a switching system. The circuit can be considered to minimize torque harmonics if it is observed that at any steady state torque and speed, both the current $I_{dc}$ and the flux $\psi$ are nearly constant, but the torque $T_e$ is cyclically variable due to instantaneous variation of the equivalent load angle $\theta_{eq}$. In practice, this condition is normal for a controlled current inverter. If current and flux vary little, then the denominator of the angle expression $I_{dc}(\psi - kI_{dc})$ is nearly constant at a given load. Then the angle ripple is essentially all torque ripple and the oscillator shifts back and forth to minimize the error in torque. It can be shown that a pulse width modulated pattern which minimizes integrated error is the theoretically ideal pattern to reduce the harmonics. Tests show that the system can generate the first three classes of PWM waveforms described in the article "Power Converters for Feeding Asynchronous Traction Motors of Single Phase AC Vehicles" by W. Lienau et al., Conference Record of the 1977 IEEE Industry Applications Society International Semiconductor Power Converter Conference, pages 295-304.

The action of the dc motor speed feedback signal $\omega_r$ is to bias integrator 33 so as to result in rotation in a single direction. Thus, when the tachometer signal is large, the inverter responds normally and phase rotation is continuous in one direction. As the tachometer signal is reduced towards zero, it allows first one extra pulse at each switching, then additional pulses as the tachometer signal gets nearer to zero. This automatically provides the changes of multipulse modes providing an ever more complex wave as speed is reduced. The present invention allows the use of angle control and multipulse operation compatibly and with the same signal hardware performing both functions.

Figure 6:
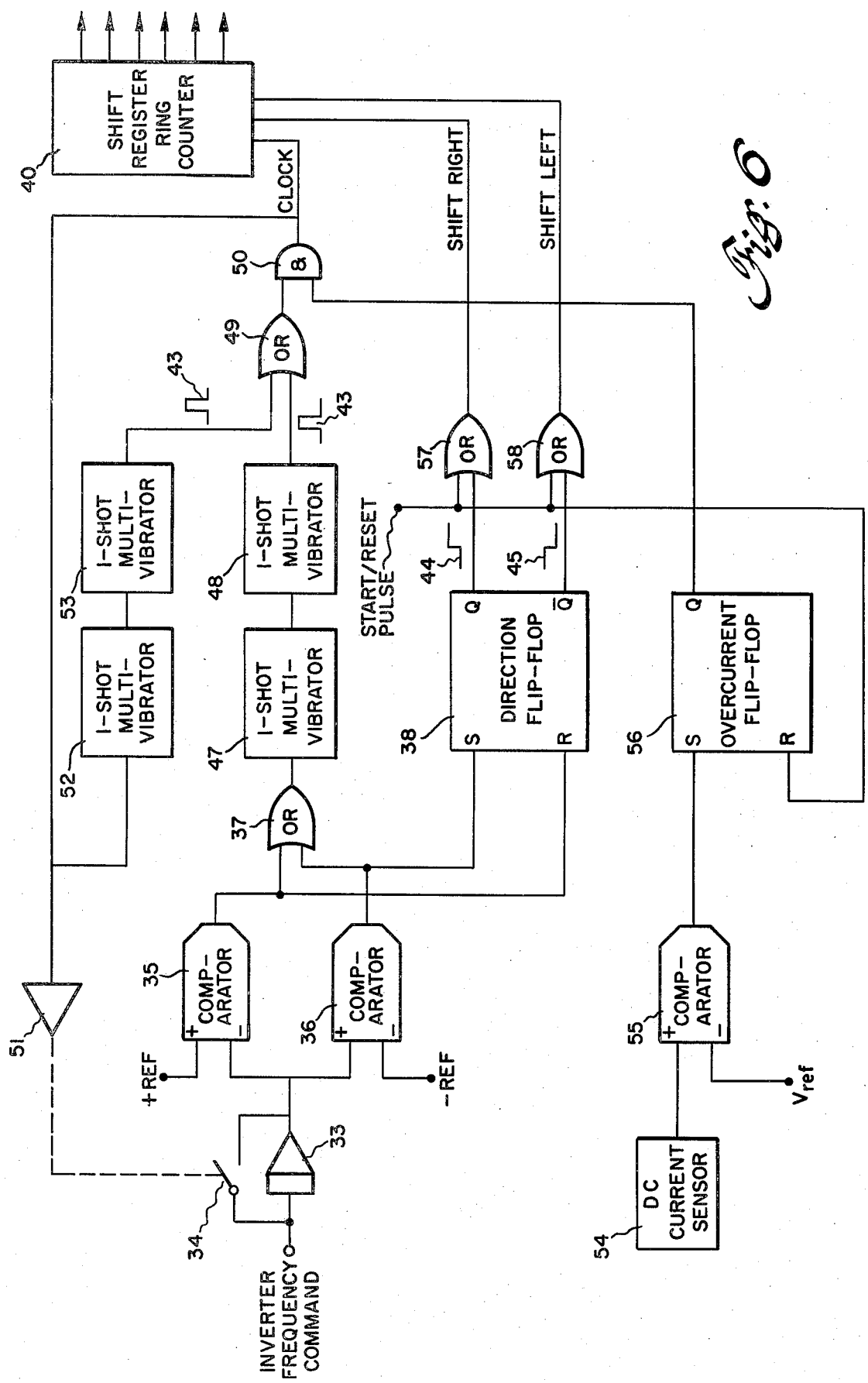
FIG. 6 is a detailed block diagram of the reversible variable frequency oscillator modified to include an overcurrent trip-out and minimum frequency limit.

The reversible variable frequency oscillator and ring counter in FIG. 6 is modified to include a minimum frequency limit and an overcurrent tripout which causes the oscillator output to cease. As was mentioned, the input to integrator 33 is integrated up to a positive or negative reference value established for comparators 35 and 36. In this embodiment the ouput of the comparators couples to direction flip-flop 38 and also through OR gate 37 to a one-shot multivibrator 47. If the comparator changing state is not the same one as previously, the state of direction flip-flop 38 changes. The comparator output is detected by one-shot multivibrator 47 which serves as a delay to allow the flip-flop to be reset, if necessary, before the next oscillator pulse occurs. This oscillator pulse is derived from one-shot multivibrator 48 which triggers on the delayed output of one-shot 47. The output of one-shot multivibrator 48 also passes through OR gate 49 and AND gate 50 and is fed back through amplifier 51 to resetting switch 34, which closes and shorts the integrating capacitor in integrator 33, zeroing it for the next cycle. The delay of one-shot multivibrator 47 has also served to give finite pulse width to the comparator outputs.

The timing pulse gated by AND circuit 50 is also input to a retriggerable one-shot multivibrator 52, and if the oscillator period from one-shot 48 exceeds the period of one-shot 52, the latter triggers a fourth one-shot multivibrator 53 which then serves as the low frequency oscillator limit. Timing pulses 43 generated either by the normal operation or by minimum frequency limit circuitry 52, 53 are coupled to the clock input of shift register ring counter 40 provided that AND gate 50 has not been disabled by the overcurrent detection and trip-out circuitry. A dc current sensor 54 senses either the dc link current or inverter output current and supplies a signal representative of the current level to an overcurrent limit comparator 55. When the current signal exceeds a reference value, the comparator output switches from low to high and generates an overcurrent signal which sets an overcurrent trip-out flip-flop 56 into the inhibited state, removing the enabling input to AND circuit 50. Timing pulses 43 are then no longer coupled to the clock input of shift register 40 and the oscillator output ceases. After overcurrent or at startup the oscillator is manually reinitialized. A start/reset pulse is applied to the reset input of overcurrent flip-flop 56, causing the output to change state and restore the enabling signal to AND gate 50. Direction signals 44 and 45 generated at the output and complementary output of direction flip-flop 38 pass through a pair of OR circuits 57 and 58 to the shift right and shift left inputs of shift register 40. Restart/reset pulse is also fed through these logic gates to reinitiate shift register operation.

In conclusion, a high performance static ac motor drive of either the current source or voltage source inverter type is characterized by smooth operation at low speeds and smooth reversing over a wide range of torque. The inverter frequency control and variable frequency oscillator respond to signal with a large ac ripple and use it to advantage when the dc component containing the desired motor speed and sense of rotation information is small. Various control strategy schemes including load angle regulation and torque regulation are possible. An application of this high performance controlled current drive with angle control is a large industrial drive.

While the invention has been particularly shown and described with reference to several preferred embodiments thereof, it will be understood by those skilled in the art that various changes in form and details may be made therein without departing from the spirit and scope of the invention.

The invention claimed is:

1. In a static variable speed reversible ac motor drive including an inverter which supplies adjustable amplitude and adjustable frequency ac power to the motor and has an inverter frequency control circuit that is responsive to an inverter frequency command signal and generates gating pulses for the inverter main thyristors, the improvement wherein said inverter frequency control comprises:

a reversible variable frequency oscillator having as an input a frequency command signal varying in accordance with the difference in magnitude between a reference value and a sensed machine parameter, said frequency command signal having a substantial ripple component and a dc component whose magnitude and polarity are indicative of the speed and direction of motor rotation;

said oscillator including an integrator and being operative to generate timing pulses and direction signals at a frequency dependent only upon the dc component of the input signal, and means responsive to said timing pulses and direction signals for generating gating pulses for the inverter main thyristors in the forward and reverse phase sequence.

2. The motor drive of claim 1 wherein said integrator generates a ramp output which rises at a rate dependent on the dc component of the input signal and wherein the oscillator further includes means for generating said timing pulses and direction signals as the integrator output repetitively rises to preset levels and is reset.

3. The motor drive of claim 2 wherein said means for generating timing pulses and direction signals comprises positive and negative comparators coupled in parallel at the integrator output, a logic gate connected between both comparators and a switch for resetting said integrator whereby timing pulses are generated at the comparator outputs, and a direction flip-flop connected to both comparators which is operative to produce forward or reverse signals.

4. The motor drive of claim 3 wherein said means for generating the thyristor gating pulses is comprised of a reversible ring counter coupled to said direction flip-flop and also coupled through a delay element to the output of said logic gate to utilize said timing pulses to actuate shifting of said ring counter.

5. The motor drive of claim 4 further including means for generating an overcurrent signal when a sensed inverter current exceeds a reference value, and another logic gate at the clock input of said ring counter connected to inhibit passage of said timing pulses upon occurrence of said overcurrent signal.

6. In a static variable speed reversible ac motor drive including an inverter which supplies adjustable amplitude and adjustable frequency ac power to the motor, said reversible ac motor drive system including an improved inverter frequency control circuit responsive to an inverter frequency command signal and generating gating signals for inverter main thyristors so as to control inverter thyristor conduction, said improved inverter frequency control circuit comprising:

a reversible variable frequency oscillator responsive to an inverter frequency command signal with a substantial ripple component and a dc component whose magnitude and polarity are indicative of the speed and direction of motor rotation, said oscillator including:

an integrator operative to generate a ramp output signal which rises at a rate dependent on the dc component of said frequency command signal;

a positive comparator and a negative comparator, each of said comparators coupled at a respective input to the integrator output;

a logic gate having a first and second input coupled at the output of said positive and said negative comparator, respectively, said logic gate producing an output signal in accordance with a predetermined relationship between signals supplied to said first and second logic gate inputs;

a switch coupled across the input and the output of said integrator for resetting said integrator responsive to logic gate output signals; and a direction flip-flop connected to each of said positive and said negative comparators for producing forward and reverse direction signals;

a delay element;

a reversible ring counter coupled between said delay element and said logic gate for generating gating pulses for inverter main thyristors when actuated by output signals produced by said logic gate; and minimum inverter frequency limiter means including a delay circuit and coupled to said ring counter for supplying clock pulses to said ring counter after a preset interval in accordance with output signals from said logic gate.

7. In a static variable speed ac induction motor drive system including a controlled current inverter which supplies adjustable amplitude and adjustable frequency ac current to the induction motor and has an inverter frequency control circuit that is responsive to an inverter frequency command signal and generates gating pulses for the inverter main thyristors in the forward and reverse phase sequence, said drive system further having a load angle feedback control for generating an angle error signal representative of the difference between the sensed instantaneous angle between motor current and motor flux and a reference value and which angle error signal is a component of the inverter frequency command signal, the improvement wherein said inverter frequency control has inherent multipulse operation at low motor speeds and comprises a reversible variable frequency oscillator having as an input an inverter frequency command signal with a substantial ripple component and a dc component whose magnitude and polarity are indicative of the speed and direction of motor rotation, said oscillator including an integrator which generates a ramp output dependent only upon the dc component of the input signal, and further including means for generating timing pulses and direction signals as the integrator output repetitively rises to preset levels, and means responsive to said timing pulses and direction signals for generating gating pulses for the inverter main thyristors in the forward and reverse phase sequence.

8. The motor drive of claim 7 wherein said integrator has a resetting switch, said means for generating timing pulses and direction signals comprises positive and negative comparators coupled in parallel to the integrator output, a logic gate connected between both comparators and said resetting switch so that either comparator output closes the switch whereby timing pulses are generated at the comparator outputs, and a direction flip-flop connected to both comparators which is operative to produce forward or reverse signals, and said means for generating thyristor gating pulses is comprised of a shift register ring counter having shift right and left inputs coupled to said direction flip-flop and having a clock pulse input connected through a delay element to the output of said logic gate to utilize the timing pulses to actuate shifting of said ring counter.

9. The motor drive of claim 8 wherein, in the load angle feedback control, said angle error signal is summed with a positive or negative dc motor speed feedback signal to generate the inverter frequency command signal, and wherein at low motor speeds the inherent operation of the variable frequency oscillator is to generate timing pulses and direction signals at a frequency exceeding six times the commanded fundamental excitation frequency so as to produce current pulses in a pulse width modulated pattern to reduce torque pulsations.

10. In a static variable speed ac induction motor drive system including a controlled current inverter which supplies adjustable amplitude and adjustable frequency ac current to the induction motor and has an inverter frequency control circuit that is responsive to an inverter frequency command signal and generates gating pulses for the inverter main thyristors in the forward and reverse phase sequence, said drive system further having a torque feedback control for generating an error signal representative of the difference between the sensed instantaneous torque and a reference value and which error signal is a component of said inverter frequency command signal, the improvement wherein said inverter frequency control has inherent multipulse operation at low motor speeds and comprises a reversible variable frequency oscillator having as an input an inverter frequency command signal with a substantial ripple component and a dc component whose magnitude and polarity are indicative of the speed and direction of motor rotation, said oscillator including an integrator which generates a ramp output dependent only upon the dc component of the input signal, and further including means for generating timing pulses and direction signals as the integrator output repetitively rises to preset levels, and means responsive to said timing pulses and direction signals for generating gating pulses for the inverter main thyristors in the forward and reverse phase sequence.

11. The motor drive of claim 10 wherein said integrator has a resetting switch, said means for generating timing pulses and direction signals comprises positive and negative comparators coupled in parallel to the integrator output, a logic gate connected between both comparators and said resetting switch so that either comparator output closes the switch whereby timing pulses are generated at the comparator outputs, and a direction flip-flop connected to both comparators which is operative to produce forward or reverse signals, and said means for generating thyristor gating pulses is comprised of a shift register ring counter having shift right and left inputs coupled to said direction flip-flop and having a clock pulse input connected through a delay element to the output of said logic gate to utilize the timing pulses to actuate shifting of said ring counter.

* * * * *